R. M. BRIGGS.

METHOD AND APPARATUS FOR APPLYING SHELLAC AND THE LIKE TO SHEET MATERIALS.

APPLICATION FILED FEB. 11, 1920.

Reissued Apr. 6, 1920. 14,833.

2 SHEETS—SHEET 1.

Inventor:
Robert M. Briggs,
by Albert G. Davis.
His Attorney.

R. M. BRIGGS.
METHOD AND APPARATUS FOR APPLYING SHELLAC AND THE LIKE TO SHEET MATERIALS.
APPLICATION FILED FEB. 11, 1920.
Reissued Apr. 6, 1920. 14,833.
2 SHEETS—SHEET 2.
Fig. 3.
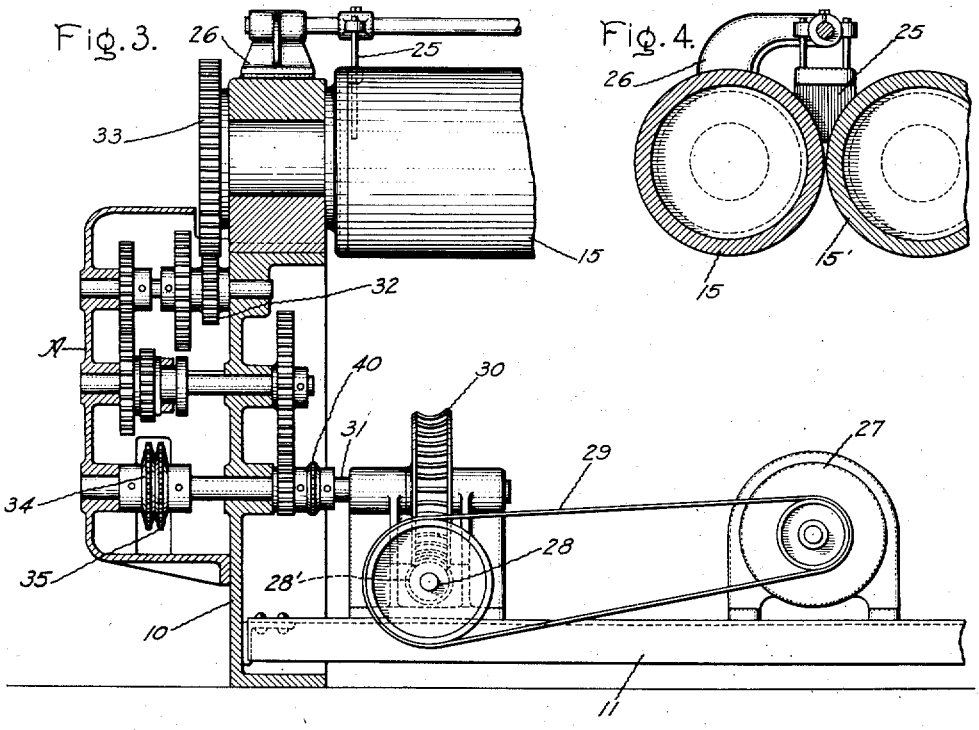
Fig. 4.
Fig. 5.
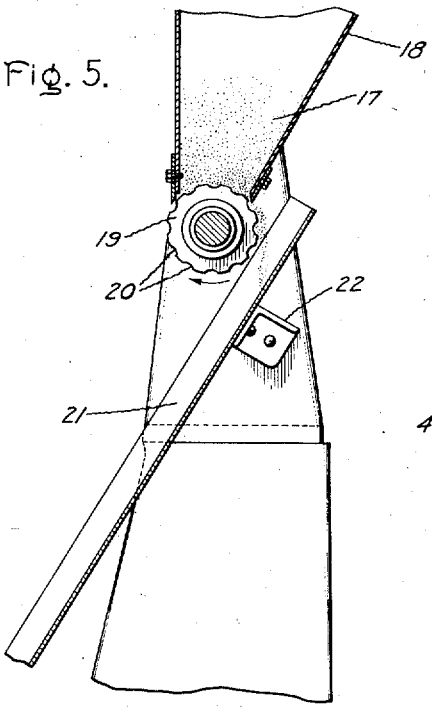
Fig. 6.
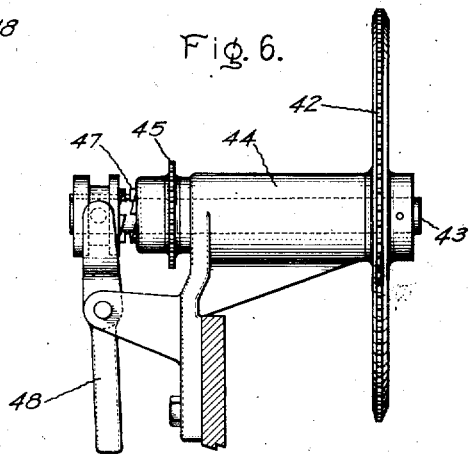
Inventor:
Robert M. Briggs,
by Albert G. Davis
His Attorney.

UNITED STATES PATENT OFFICE.

ROBERT M. BRIGGS, OF PITTSFIELD, MASSACHUSETTS, ASSIGNOR TO GENERAL ELECTRIC COMPANY, A CORPORATION OF NEW YORK.

METHOD AND APPARATUS FOR APPLYING SHELLAC AND THE LIKE TO SHEET MATERIALS.

14,833. Specification of Reissued Letters Patent. Reissued Apr. 6, 1920.

Original No. 1,311,491, dated July 29, 1919, Serial No. 202,649, filed November 17, 1917. Application for reissue filed February 11, 1920. Serial No. 357,829.

*To all whom it may concern:*

Be it known that I, ROBERT M. BRIGGS, a citizen of the United States, residing at Pittsfield, county of Berkshire, State of Massachusetts, have invented certain new and useful Improvements in Methods and Apparatus for Applying Shellac and the like to Sheet Materials, of which the following is a specification.

My invention relates to a novel method of applying shellac and the like to sheets of material and especially fibrous material, such as paper from which insulating tubes and the like are to be made; it also relates to a novel machine by which this coating process is carried out.

Shellac and similar resinous binding material have hitherto been applied to paper in a solution, alcohol usually being used as the solvent. This solvent is expensive, and besides its use is attended with the additional disadvantage that the same must be expelled from the surface of the paper as its presence diminishes the insulating properties thereof, particularly when the same is used in the manufacture of paper tubes. This expulsion of the alcohol requires a considerable time and to that extent retards the process. In accordance with my invention, the shellac or other binder is applied to the surface of the paper or other sheet in a solid form and made fluid by the application of heat without the use of a solvent, thereby avoiding the disadvantages above referred to.

Figure 1:
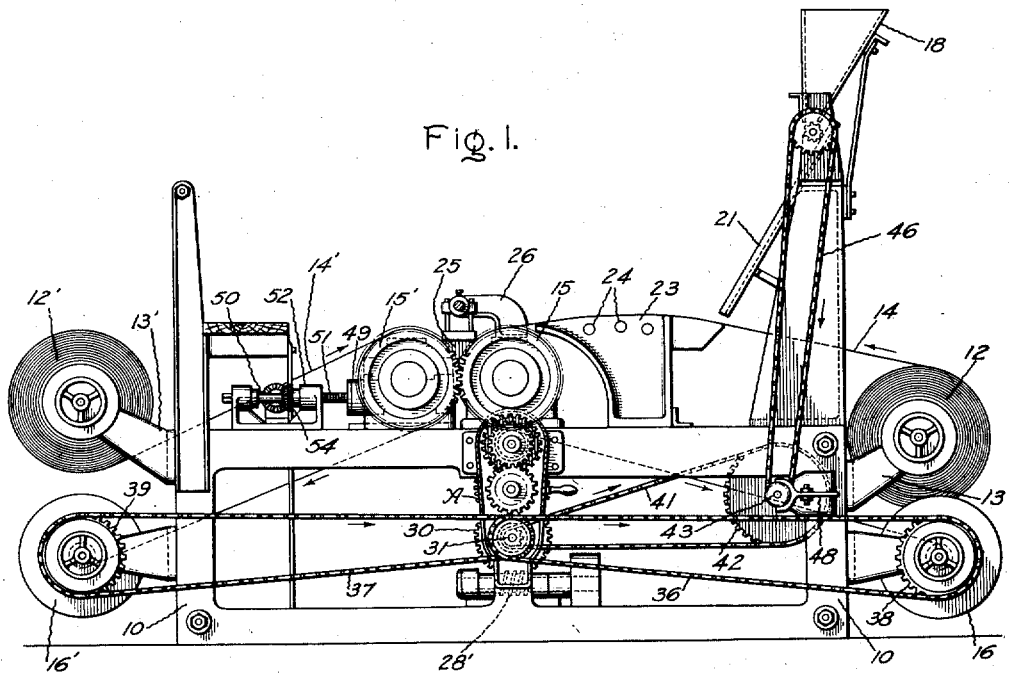
Figure 2:
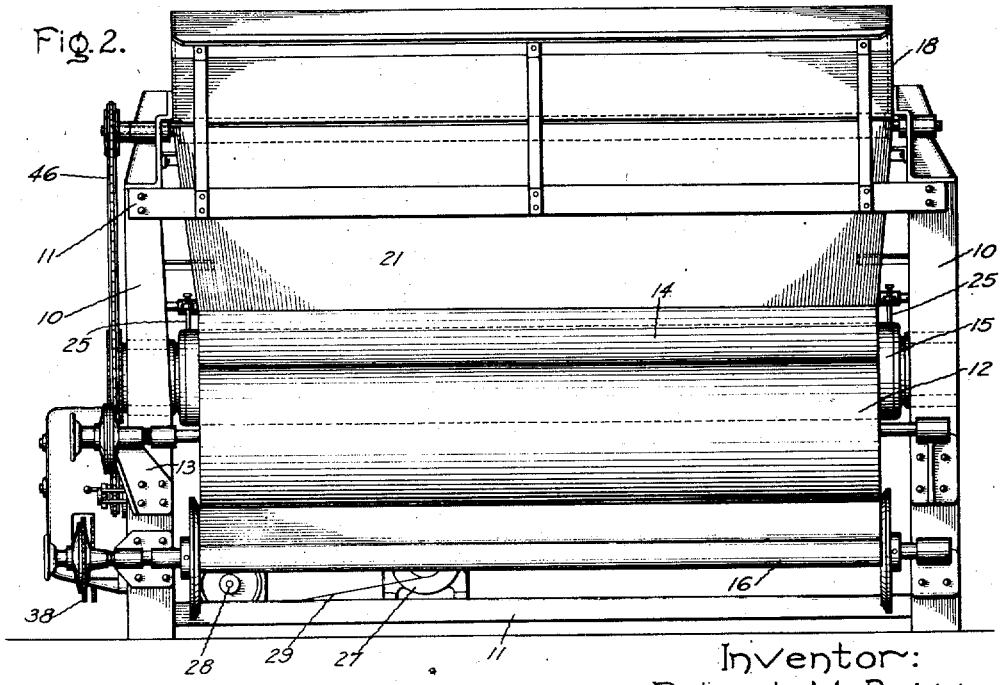

My invention will best be understood by reference to the accompanying drawings in which I have illustrated a machine constructed in accordance with my invention and by which the paper or other sheet material may be coated with shellac and the like, Figure 1 being a side view of such machine; Fig. 2 is an end view; Fig. 3 is a sectional elevation of a portion of the machine showing the driving connections between the motor and one of the rolls over which the paper is passed; Fig. 4 is a cross section of the rolls shown in Fig. 3; Fig. 5 is a detail view of the hopper from which shellac and the like is fed to the machine; and Fig. 6 is a detail view of the clutch mechanism associated with the hopper and the driving motor connections.

Referring now to the drawings, the frame of the machine comprises vertical supporting members 10 which are connected together and held in position by cross bars 11. Two drums 12 and 12′, on which the sheet material to be coated is wound, are supported on brackets 13 and 13′. The sheet material is here shown as sheets of paper 14 and 14′ which are reeled from the drums, the respective sheets passing between adjacently disposed application rolls 15 and 15′ from which they pass to receiving rolls 16 and 16′.

I prefer to apply the shellac (simultaneously) to two surfaces of the paper by maintaining a pool of fused shellac at the point where the surfaces converge or enter the rolls and continually renewing the pool with fresh shellac so as to avoid polymerization. In the particular embodiment of my invention which I have illustrated herein, the shellac is fed, in the form of a powder, from a suitable container onto one of the sheets of paper which is caused to pass over a hot body or surface as it approaches the rolls so that the shellac is fused on the surface of the paper before it reaches the pool at the point where the paper enters the rolls.

In the arrangement shown in the drawings the powdered shellac 17 or other similar material is carried in a hopper 18 from which the same is fed onto the paper. Between the point where the shellac is fed to the paper and the application rolls 15 and 15′, I have provided a heating table 23 over which the paper passes. This table is heated sufficiently to cause the powdered shellac to become fused as it passes over the same. The rolls 15 and 15′ are also heated so that the shellac will be maintained in a fluid condition until it is applied to the paper. The heated table 23 and the rolls 15 and 15′ are preferably electrically heated, although any suitable source of heat may be employed. The electrical heating units for the heating table are shown at 24. The heating units for the rolls are not shown in the drawing. Shellac polymerizes after it has been subjected to a high temperature for any great length of time and becomes infusible at that temperature; hence it is undesirable that the shellac should remain in a fused condition for any great length of time. For this reason the heating table over which the paper passes is disposed relatively near the application rolls so that the shellac remains in a heated condition for only a short time in passing from the heating table to the application rolls, and since a new stock of material is being continuously supplied to the pool formed between the rolls, none of the shellac remains in a fused condition for a sufficiently long time to interfere with its treatment in the subsequent steps of the process, and the shellac can again be fused without difficulty, as for example, when the coated paper is used for making insulating paper tubes. As shown the two surfaces of the sheet material being coated pass convergingly into engagement between the two rolls, beyond which these surfaces are again separated, leaving an even coating on either surface which is then cooled and accordingly dried as the sheet material passes from the application rolls to the receiving rolls.

A member 19 (see Fig. 5), generally cylindrical in form, is rotatably mounted in the bottom of the hopper and is so designed as to close the bottom thereof. The cylinder is provided on its periphery with longitudinally extending grooves 20 which are filled with powdered material, as they are brought beneath the same by the rotation of the cylinder. This material is carried outside the casing as the cylinder is rotated and is emptied into a chute 21 from which the same is spread on the surface of sheet 14 in powdered form. The chute is supported on a bracket 22.

Vertical retaining members 25 which conform to the vertical contour of the rolls are provided at the ends of the rolls for maintaining the pool in position longitudinally between the rolls. The members 25 are supported by brackets 26. The machine is operated by a motor which I have shown as an electric motor 27 which drives a shaft 28 by means of a belt 29. To the shaft 28 is secured a worm 28′ which engages a worm wheel 30 secured on a shaft 31. One of the rolls 15 is rotated from the shaft 31 through a system of gears which I have indicated in general by the reference character A, and which need not be specifically described. The last gear wheel 32 in the train engages a gear wheel 33 mounted on the shaft carrying the roll 15. The other roll is rotated because of its engagement with the other roll or with the paper passing between the rolls, as the case may be. The shaft 31 is also provided with sprocket wheels 34 and 35 which are engaged by sprocket chains 36 and 37 respectively, and the latter in turn engage sprocket wheels 38 and 39 mounted on the shafts carrying the rolls 16 and 16′ respectively.

The cylinder 19 is operated from the shaft 31 by means of a third sprocket 40 secured on said shaft (see Fig. 3), the movement of which is transmitted by sprocket chain 41 to a sprocket wheel 42. This sprocket wheel is secured on a counter-shaft 43, the latter being journaled in a bearing 44. A second sprocket 45 is loosely mounted on the shaft which actuates the cylinder 19 through a sprocket chain 46 which engages a sprocket wheel mounted on said shaft. The sprocket wheel 45 is connected to and disconnected from the shaft 43 by means of a claw clutch 47 actuated by a handle 48.

The distance between the rolls 15 and 15′ is regulated by the adjustment of one of the rolls 15′ by means of heads 49, only one of which is shown in the drawing. These heads engage the slidable journal blocks in which the shaft carrying the roll 15′ is mounted. The heads 49 are moved longitudinally by shafts 50 provided with screw threads at 51 which engage threads (not shown) on the interior of collars 52 through which the shafts pass. One of the shafts 50 is rotated by means of a shank 53 which is engaged by a suitable handle. The head 49 which is not shown in the drawing may be actuated through suitable bevel gears 54 and 55 in the same manner as the one which has just been described.

The operation of the machine which will readily be understood from the foregoing is as follows:

Two sheets of paper 14 and 14′ are simultaneously reeled from the distributing rolls 12 and 12′ passing between the rolls 15 and 15′ from which the same are wound on to the receiving rolls 16 and 16′. The powdered material is fed to the surface of one of the sheets as 14 on the surface of which it is fused by the heating member 23 immediately before the sheet reaches the application rolls. The rolls, the surfaces of which should be carefully trued, are closely and accurately spaced. This spacing in practice is done by forcing the rolls when the coated paper is between the same into close engagement by means of the heads 49. In passing between the rolls a layer of fused shellac is evenly applied to each sheet of paper and the pressure of the rolls upon the sheets of paper serves to remove from the surfaces thereof any excess of fused material and also serves to distribute evenly the fused shellac over the surfaces of both sheets.

The size of the pool which is formed by the fused material between the rolls is adjusted by regulating the feed of the powdered material to the paper and this is accomplished by connecting and disconnecting the feeding mechanism by means of the clutch 47. When the pool of fused coating substance becomes too large the feeding mechanism is simply disconnected by means of the clutch until the pool is reduced the desired amount and then the feeding mechanism will again be connected. While I have shown a feeding device for applying the shellac to but one surface and in practice I have found the single feeding device sufficient, it will, of course, be understood that a second feeding device may, if desired, be used for feeding the material to the other surface. It will be understood, therefore, that when I refer in the claims to means for applying shellac to one surface of the sheet material to be coated, I mean to include any means that would apply the same to both surfaces converging at the rolls.

While I have described my invention in connection with a machine embodying a concrete structure and as operating in a specific manner in accordance with the provision of the patent statues, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The method of coating sheet material with shellac and the like, which consists in progressively applying undissolved shellac to the surface of the sheet, fusing the shellac, and distributing the same in an even layer on the sheet.

2. The method of coating sheet material with shellac and the like, which consists in progressively applying the shellac in solid form to the surface of the sheet, fusing the shellac to form a pool and distributing the same in an even layer on the sheet and removing the excess by means of pressure.

3. The method of coating sheet material with shellac and the like, which consists in simultaneously moving two different surfaces of said material into converging relation, independently applying heat to each surface, and conveying undissolved shellac into the crevice between said converging surfaces to form therein a continuous pool of fused shellac, thereby coating both of said surfaces simultaneously.

4. The method of coating sheet material with shellac and the like, which consists in passing two surfaces of said material convergingly between heated rolls suitably forced together, forming a pool of fused shellac at the point where said surfaces converge and continually maintaining the pool by renewing the shellac therein, and separating the surfaces after they pass between the rolls.

5. The method of coating sheet material with shellac and the like, which consists in passing two surfaces of said material between heated rolls suitably forced together, forming a pool of fused shellac at a point where said surfaces enter the rolls and maintaining the pool by renewing it with shellac in a fused condition, and separating the surfaces after they pass between the rolls.

6. The method of coating sheet material with shellac and the like, which consists in applying the shellac in solid form to the surface of the sheet, fusing the shellac, passing the sheet through a pressure device in close proximity to another sheet so as to apply an even layer to both sheets and then separating the sheets.

7. The method of coating sheet material with shellac and the like, which consists in applying the shellac in solid form to a surface of the sheet material, fusing the shellac, passing the sheet through a pressure device located near the point where the shellac is fused and in engagement with a second surface and then separating the surfaces.

8. The method of coating sheet material with shellac and the like, which consists in applying the shellac in solid form to a surface of the sheet material, fusing the shellac, passing the sheet through a pressure device located near the point where the shellac is fused and in engagement with a second sheet, thereby forming a pool of fused shellac, and regulating the size of the pool and then separating the sheets.

9. A machine for coating sheet material with shellac and the like, comprising means for applying undissolved shellac to the surface of a sheet, means for fusing the shellac thereon to form a pool, and means located adjacent the fusing means for progressively removing from the surface of the sheet the excess of fused shellac.

10. A machine for simultaneously coating two separate surfaces of sheet material with shellac and the like, comprising heated bodies for separately applying heat to said surfaces, said bodies being placed in juxtaposition under pressure and arranged to have said sheet material pass therebetween, and means for progressively supplying shellac in solid form in advance of a heated body to form a continuous pool of fused coating substance at the junction of said surfaces between said bodies.

11. A machine for coating sheet material with shellac and the like, comprising means for applying shellac in solid form to the surface of the sheet, means for fusing the shellac thereon, means for transferring a portion of the shellac from the coated sheet to a second sheet and subsequently separating the sheets.

12. A machine for coating sheet material with shellac and the like, comprising distributing rolls and receiving rolls, means for transferring separate sheets of material from the respective distributing rolls to the receiving rolls, means for applying shellac and the like in solid form to the surface of one of the sheets, means for fusing the shellac on said surface, and adjacently disposed members over which the two sheets pass in contact for applying and evenly distributing the shellac on both sheets.

13. A machine for coating sheet material with shellac and the like, comprising distributing rolls and receiving rolls, means for transferring separate sheets of material from the respective distributing rolls to the receiving rolls, means for applying shellac and the like in solid form to the surface of one of the sheets, means for fusing the shellac on said sheet, and adjacently disposed rolls over which the two sheets pass in engagement with each other for applying the shellac and evenly distributing the same on both sheets.

14. A machine for coating sheet material with shellac and the like, comprising distributing rolls and receiving rolls, means for transferring separate sheets of material from the distributing rolls to the receiving rolls, means for applying shellac and the like in solid form to the surface of one of the sheets, means for fusing the shellac on the surface of said sheet, adjacently disposed rolls located near said fusing means and between which the sheet material passes whereby a pool of fused shellac is formed between the surfaces converging at the rolls, and means for regulating the size of said pool.

In witness whereof, I have hereunto set my hand this 4th day of Feb., 1920.

ROBERT M. BRIGGS.